US011927317B2

(12) United States Patent
Zhu et al.

(10) Patent No.: US 11,927,317 B2
(45) Date of Patent: Mar. 12, 2024

(54) VEHICLE LIGHT OPTICAL ELEMENT ASSEMBLY, VEHICLE LIGHTING DEVICE, VEHICLE LIGHT AND VEHICLE

(71) Applicant: HASCO VISION TECHNOLOGY CO., LTD., Shanghai (CN)

(72) Inventors: He Zhu, Shanghai (CN); Zhiping Qiu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 113 days.

(21) Appl. No.: 17/760,905

(22) PCT Filed: Nov. 17, 2020

(86) PCT No.: PCT/CN2020/129309

§ 371 (c)(1),
(2) Date: Mar. 16, 2022

(87) PCT Pub. No.: WO2021/179664

PCT Pub. Date: Sep. 16, 2021

(65) Prior Publication Data

US 2022/0349542 A1 Nov. 3, 2022

(30) Foreign Application Priority Data

Mar. 9, 2020 (CN) ......................... 202020281769.6

(51) Int. Cl.
*F21S 41/143* (2018.01)
*F21S 41/265* (2018.01)
(Continued)

(52) U.S. Cl.
CPC ........... *F21S 41/143* (2018.01); *F21S 41/265* (2018.01); *F21S 41/275* (2018.01);
(Continued)

(58) Field of Classification Search
CPC . F21S 41/143; F21S 41/275; F21W 2102/135
See application file for complete search history.

(56) References Cited

U.S. PATENT DOCUMENTS 9,719,648 B2 8/2017 Lo et al.
10,082,272 B2 9/2018 Gromfeld
(Continued)

FOREIGN PATENT DOCUMENTS

CN 108474534 A 8/2018
CN 109140377 A 1/2019
(Continued)

OTHER PUBLICATIONS

GB 4599-2007, National Standard of the People's Republic of China, Motor vehicle headlamps equipped with filament amps (2017).

(Continued)

*Primary Examiner* — Karabi Guharay
(74) *Attorney, Agent, or Firm* — Volpe Koenig

(57) ABSTRACT

A vehicle light optical element assembly of a vehicle lamp, and a vehicle lighting device, a vehicle lamp and a vehicle comprising the vehicle light optical element assembly of the vehicle lamp. The vehicle light optical element assembly comprises a low-beam primary optical element, a high-beam primary optical element provided below the low-beam primary optical element, and a lens provided on the front end of the low-beam primary optical element and/or the high-beam primary optical element, wherein the low-beam primary optical element and/or the high-beam primary optical element are integrated with the lens, and the low-beam primary optical element and the high-beam primary optical element are suitable for light convergence and collimation to then pass through the lens to form a low-beam illumination light shape and a high-beam illumination light shape. The vehicle light optical element assembly has the advantages of (Continued)

a compact structure, small volume, and high assembly accuracy.

17 Claims, 7 Drawing Sheets

(51) Int. Cl.

| | |
|---|---|
| ***F21S 41/275*** | (2018.01) |
| ***F21Y 115/10*** | (2016.01) |
| *F21W 102/135* | (2018.01) |
| *F21W 107/10* | (2018.01) |

(52) U.S. Cl.

CPC ... *F21W 2102/135* (2018.01); *F21W 2107/10* (2018.01); *F21Y 2115/10* (2016.08)

(56) References Cited

U.S. PATENT DOCUMENTS

| | | | |
|---|---|---|---|
| 2017/0089536 A1 | 3/2017 | Courcier et al. | |
| 2017/0292671 A1* | 10/2017 | Gousset-Rousseau | F21S 41/153 |
| 2018/0087745 A1* | 3/2018 | Gromfeld | F21V 7/06 |

FOREIGN PATENT DOCUMENTS

| | | | |
|---|---|---|---|
| CN | 109268774 | A | 1/2019 |
| CN | 209782494 | U | 12/2019 |
| CN | 209801362 | U | 12/2019 |
| JP | 2005-276805 | A | 10/2005 |
| JP | 2017-228452 | A | 12/2017 |
| JP | 2018-098011 | A | 6/2018 |
| WO | 2020/064978 | A1 | 4/2020 |
| WO | 2021/078114 | A1 | 4/2021 |
| WO | 2021/078115 | A1 | 4/2021 |

OTHER PUBLICATIONS

First Japanese Office Action datedFeb. 13, 2023 for Japanese Patent Application No. 2022-520919.

Second Japanese Office Action dated Jul. 31, 2023 for Japanese Patent Application No. 2022-520919.

Extended European Search Report dated Oct. 7, 2022 for European Patent Application No. 20924803.8.

European Communication Pursuant to Article 94(3) EPC dated Jun. 16, 2023 for European Patent Application No. 20924803.8.

* cited by examiner

VEHICLE LIGHT OPTICAL ELEMENT ASSEMBLY, VEHICLE LIGHTING DEVICE, VEHICLE LIGHT AND VEHICLE

CROSS REFERENCE TO RELATED APPLICATIONS

This application is a 35 USC § 371 National Stage application of International Patent Application No. PCT/CN2020/129309, which was filed Nov. 17, 2020, entitled “VEHICLE LIGHT OPTICAL ELEMENT ASSEMBLY, VEHICLE LIGHTING DEVICE, VEHICLE LIGHT AND VEHICLE” and claims priority to Chinese Patent Application No. 202020281769.6, filed Mar. 9, 2020, which is incorporated herein by reference as if fully set forth.

FIELD OF INVENTION

The present disclosure relates to vehicle lights, and specifically relates to a vehicle light optical element assembly. In addition, the present disclosure further relates to a vehicle lighting device, a vehicle light and a vehicle.

BACKGROUND

In recent years, vehicle lights and headlamp modules assembled in vehicle lights have been rapidly developed. From the early halogen lamps to the later Xenon lamps and to the current LEDs and laser light sources, the vehicle lights have become more intelligent, and the modeling is more differentiated. In various vehicle light sources, LED light sources are gradually getting the attention of automobile manufacturers due to their excellent performance and low-cost advantages. With the development of the LED light sources, their light distribution structure is gradually developing.

In the prior art, a projection lighting system of an LED light source commonly used in vehicle lights generally includes a light source, a reflection element, a light shield plate and an optical lens. Light emitted by the light source is emitted to the light shield plate after being reflected by the reflection element. After being intercepted by the light shield plate, the light is projected by the optical lens to form a lighting light shape with a light and shade cut-off line. However, due to a large light emitting angle of the LED light source, the dimension of the reflection element needs to have a larger coverage range relative to a light-exiting angle of the light source to ensure certain system light efficiency, but this is in prominent contradiction with the trend of increasingly compact modelings of vehicles in the future. Therefore, a compact, lightweight and efficient optical system is needed to meet the strong market demand.

In view of the above-mentioned shortcomings of the prior art, it is necessary to design a vehicle light optical element assembly.

SUMMARY

The problem to be solved by the first aspect of the present disclosure is to provide a vehicle light optical element assembly which is compact in structure, smaller in size and high in assembling accuracy.

In addition, the problem to be solved by the second aspect of the present disclosure is to provide a vehicle lighting device. A vehicle light optical element assembly in the vehicle lighting device is compact in structure, smaller in size and high in assembling accuracy.

Further, the problem to be solved by the third aspect of the present disclosure is to provide a vehicle light. A vehicle light optical element assembly in the vehicle light is compact in structure, smaller in size and high in assembling accuracy.

Further, the problem to be solved by the fourth aspect of the present disclosure is to provide an automobile. A vehicle light optical element assembly of the vehicle is compact in structure, smaller in size and high in assembling accuracy.

In order to solve the above-mentioned technical problems, the first aspect of the present disclosure provides a vehicle light optical element assembly, including a low-beam primary optical element, a high-beam primary optical element provided below the low-beam primary optical element, and a lens provided at the front end of the low-beam primary optical element and/or the high-beam primary optical element. The low-beam primary optical element and/or the high-beam primary optical element are/is integrated with the lens; the low-beam primary optical element sequentially, from back to front, includes a low-beam condensation part and a low-beam light passing part; the low-beam light passing part and a lens light-incidence part are integrated; a front edge of the lower surface of the low-beam light passing part is formed into a low-beam cut-off line structure; the high-beam primary optical element includes at least one high-beam condensation part; a high-beam light-exiting surface is formed at the front end of the high-beam condensation part; or, the high-beam primary optical element sequentially, from back to front, includes at least one high-beam condensation part and a high-beam light passing part; the high-beam light passing part and the lens light-incidence part are integrated; a front edge of the upper surface of the high-beam light passing part is formed into a high-beam cut-off line structure; the low-beam primary optical element includes at least one low-beam condensation part; a low-beam light-exiting surface is formed at the front end of the low-beam condensation part. Or, the low-beam sequentially, from back to front, includes at least one low-beam condensation part and a low-beam light passing part, and the high-beam sequentially, from back to front, includes at least one high-beam condensation part and a high-beam light passing part; the low-beam light passing part and the high-beam light passing part are integrated with the lens light-incidence part; a front edge of the lower surface of the low-beam light passing part is formed into a low-beam cut-off line structure; and a front edge of the upper surface of the high-beam light passing part is formed into a high-beam cut-off line structure. A wedge-shaped gap is formed between the low-beam light passing part and the high-beam light passing part; the lens includes the lens light-incidence part and a lens light-exiting part; the lens light-incidence part is a plane, a backwards protruding curved surface or a forwards protruding curved surface; the lens light-exiting part is a forwards protruding curved surface; and the low-beam primary optical element and the high-beam primary optical element are suitable for focusing and collimating light and then forming a low-beam lighting light shape and a high-beam lighting light shape via the lens.

As a preferred structural form, a plurality of low-beam condensation parts are provided in a left-right direction, and a plurality of high-beam condensation parts are provided in a left-right direction.

As another preferred structural form, the low-beam condensation part is of a condensation cup structure or a protrusion structure which protrudes towards the back.

More preferably, the high-beam condensation part is of a condensation cup structure or a protrusion structure which protrudes towards the back.

As a further preferred structural form, the back end of the condensation cup structure is provided with a concave cavity; the bottom of the concave cavity is provided with a protrusion; an external contour surface of the condensation cup structure is of a curved structure having an aperture that is gradually increased from the back end to the front end; or the condensation cup structure is solid, a light-incidence surface of which is a plane, a convex curved surface or a concave curved surface; and the external contour surface of the condensation cup structure is of a curved structure having an aperture that is gradually increased from the back end to the front end.

The second aspect of the present disclosure provides a vehicle lighting device, including low-beam light sources, high-beam light sources, and the vehicle light optical element assembly according to any one of the above-mentioned technical solutions. The low-beam light sources are in one-to-one correspondence to the low-beam condensation parts, and the high-beam light sources are in one-to-one correspondence to the high-beam condensation parts.

As a specific implementation mode, the vehicle lighting device further includes a low-beam circuit board and a high-beam circuit board; the low-beam light sources are provided on the low-beam circuit board, and the high-beam light sources are provided on the high-beam circuit board; or the vehicle lighting device further includes a circuit board, and the low-beam light sources and the high-beam light sources are both provided on the circuit board.

The third aspect of the present disclosure provides a vehicle light, including at least one vehicle lighting device according to any one of the technical solutions.

The fourth aspect of the present disclosure provides a vehicle, including the vehicle light according to the above-mentioned technical solution.

By means of the above-mentioned technical solutions, the vehicle light optical element assembly of the present disclosure includes the low-beam primary optical element, the high-beam primary optical element provided below the low-beam primary optical element, and the lens provided at the front end of the low-beam primary optical element and/or the high-beam primary optical element. The low-beam primary optical element and/or the high-beam primary optical element are/is integrated with the lens; and the low-beam primary optical element and the high-beam primary optical element are suitable for focusing and collimating light and then forming a low-beam lighting light shape and a high-beam lighting light shape via the lens. By means of integrating the low-beam primary optical element with the lens, or integrating the high-beam primary optical element with the lens, or simultaneously integrating the low-beam primary optical element and the high-beam primary optical element with the lens, the size of the vehicle light optical element assembly can be effectively reduced without affecting high-beam lighting and low-beam lighting, and the installation accuracy and the optical system accuracy can also be improved.

Other advantages of the present disclosure and the technical effects of the preferred implementation modes will be further described in the following specific implementation modes.

Figure 1:
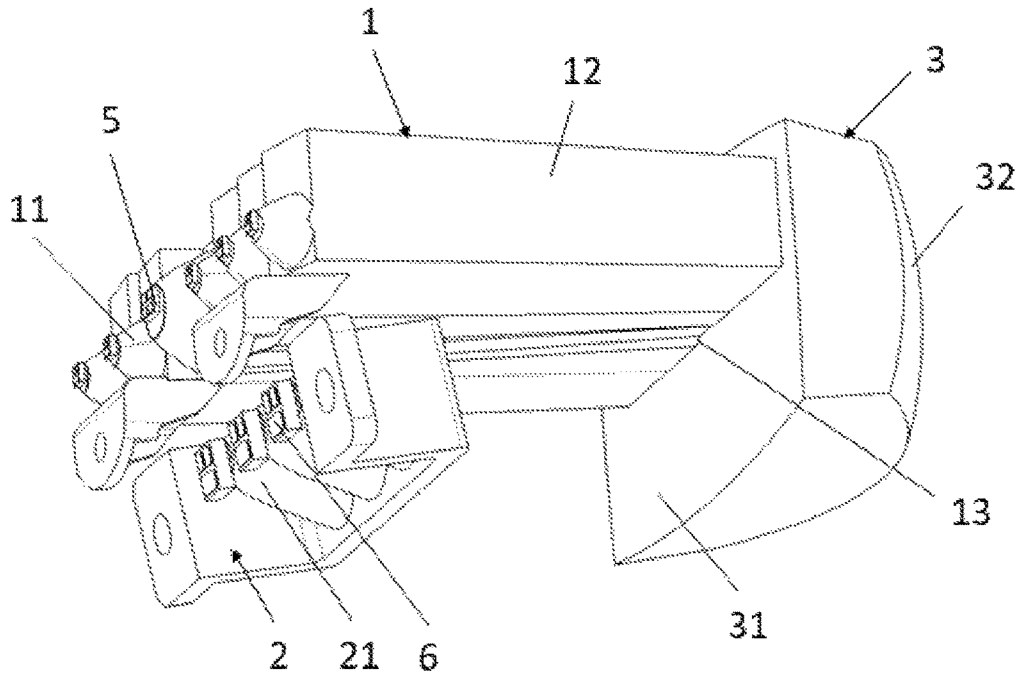
FIG. 1 is a three-dimensional structural schematic diagram of a vehicle light optical element assembly of a first specific embodiment of the present disclosure.
Figure 2:
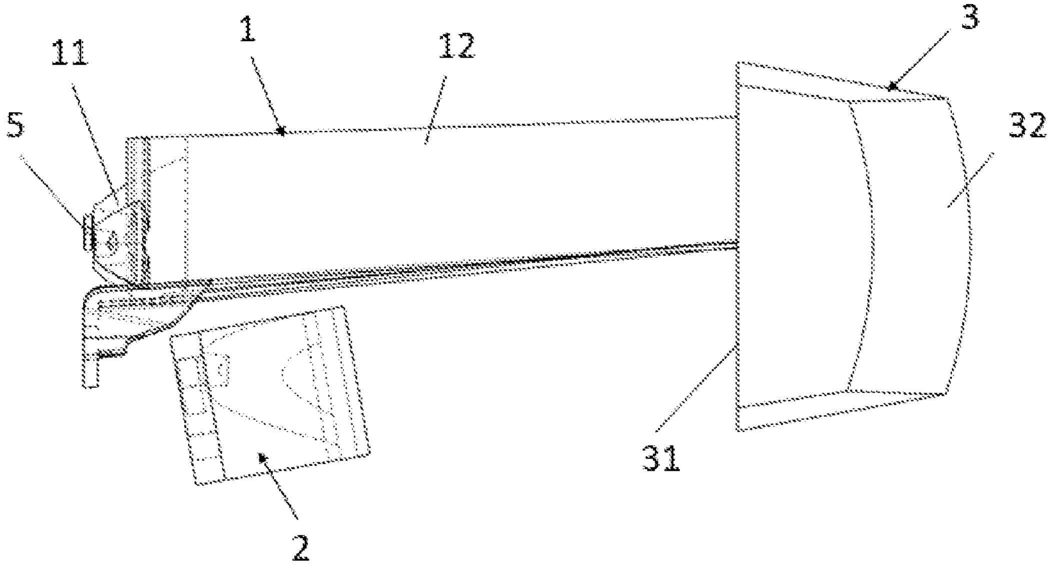
FIG. 2 is a side view of a vehicle light optical element assembly of the first specific embodiment of the present disclosure.

| | |
|---|---|
| 1: low-beam primary optical element | 11: low-beam condensation part |
| 12: low-beam light passing part | 13: low-beam cut-off line structure |
| 14: low-beam light-exiting surface | 2: high-beam primary optical element |
| 21: high-beam condensation part | 22: high-beam light passing part |
| 23: high-beam cut-off line structure | 24: high-beam light-exiting surface |
| 3: lens | 31: lens light-incidence part |
| 32: lens light-exiting part | 4: wedge-shaped gap |
| 5: low-beam light source | 6: high-beam light source |
| 7: vehicle lighting device | 8: low-beam cut-off line |
| 9: automobile lamp light shape in a low-beam mode | 10: automobile lamp light shape in a high-beam mode |

DETAILED DESCRIPTION OF THE EMBODIMENTS

Specific implementation modes of the present disclosure will be described in detail below with reference to the accompanying drawings. It should be understood that the specific implementation modes described herein are only used to illustrate and explain the present disclosure, and are not intended to limit the present disclosure.

Firstly, it should be noted that in the following description, some orientation words, such as “back”, “front”, “left-right”, etc., that are involved in order to clearly illustrate the technical solutions of the present disclosure are all analogous to meanings of orientations pointed by a light-exiting path. For example, a vehicle light optical element assembly is taken as an example. The end, close to a low-beam light source or a high-beam light source, of the vehicle light optical element assembly is the back end, and the end far away from the low-beam light source or the high-beam light source is the front end. It can also be understood that the end, provided with the condensation part, of the vehicle light optical element assembly is the back end, and the end provided with the lens light-exiting part is the front end; and relative to the front-back direction of the vehicle light optical element assembly, a direction from the left side to the right side of the vehicle light optical element assembly is a left-right direction.

In the description of the present disclosure, it should be noted that the terms "installation" and "connection" should be understood in a broad sense unless otherwise specified and limited. For example, it may be fixed connection, detachable connection, or integrated connection, or may be direct connection or indirect connection through an intermediate medium, or may be internal communication of two elements or interaction between two elements. For those of ordinary skill in the art, the specific meanings of the above terms in the present disclosure can be understood according to specific situations.

The present disclosure provides a vehicle light optical element assembly, including a low-beam primary optical element 1, a high-beam primary optical element 2 provided below the low-beam primary optical element 1, and a lens 3 provided at the front end of the low-beam primary optical element 1 and/or the high-beam primary optical element 2.

The low-beam primary optical element 1 and/or the high-beam primary optical element 2 are/is integrated with the lens 3; and the low-beam primary optical element 1 and the high-beam primary optical element 2 are suitable for focusing and collimating light and then forming a low-beam lighting light shape and a high-beam lighting light shape via the lens 3.

It can be seen from the above-mentioned description that the vehicle light optical element assembly of the present disclosure mainly has three basic structure solutions: First, the low-beam primary optical element 1 and the lens 3 are integrated, that is, a light-exiting surface of the low-beam primary optical element 1 and a light-incidence surface of the lens 3 are coplanar, and the high-beam primary optical element 2 is provided below the low-beam primary optical element 1. Second, the high-beam primary optical element 2 and the lens 3 are integrated, that is, a light-exiting surface of the high-beam primary optical element 2 and the light-incidence surface of the lens 3 are coplanar, and the low-beam primary optical element 1 is provided above the high-beam primary optical element 2. Third, the lens 3 is simultaneously integrated with the low-beam primary optical element 1 and the high-beam primary optical element 2, that is, the light-incidence surface of the lens 3 is coplanar with the light-exiting surface of the low-beam primary optical element 1 and the light-exiting surface of the high-beam primary optical element 2, and the high-beam primary optical element 2 is provided below the low-beam primary optical element 1. This setting has the advantages that a space occupied by the vehicle light optical element assembly in a vehicle lighting device and the size of the vehicle lighting device are reduced without affecting a light-exiting effect and the light-exiting efficiency; moreover, the low-beam primary optical element 1 and/or the high-beam primary optical element 2 and the lens 3 are made into a whole, so that the number of parts can be reduced, the positioning and installation error between original parts can also be reduced, and the accuracy of an optical system of the vehicle lighting device is improved.

Figure 12:
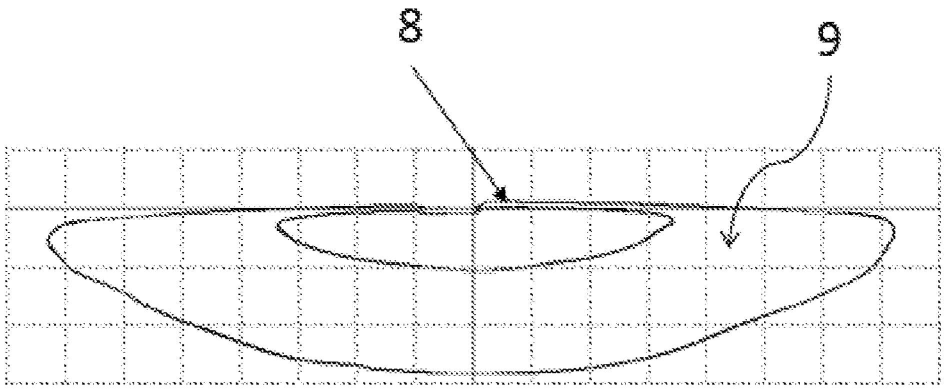
FIG. 12 is a schematic diagram of an automobile lamp light shape in a low-beam mode of a specific implementation mode of the present disclosure.
Figure 13:
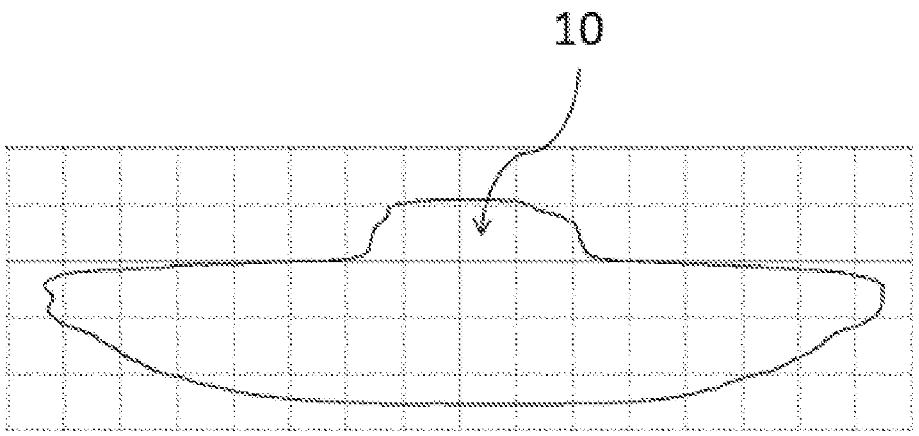
FIG. 13 is a schematic diagram of an automobile lamp light shape in a high-beam mode of a specific implementation mode of the present disclosure.

The low-beam primary optical element 1 and/or the high-beam primary optical element 2 and the lens 3 in the present disclosure are made into a whole, but this does not affect the formed automobile lamp light shape. Both the automobile lamp light shape in the low-beam mode as shown in FIG. 12 and the automobile lamp light shape in the high-beam mode as shown in FIG. 13 can meet an automobile lamp lighting requirement.

As a preferred structural form, the lens 3 includes a lens light-incidence part 31 and a lens light-exiting part 32; the lens light-incidence part 31 is a plane, a backwards protruding curved surface or a forwards protruding curved surface; and the light-exiting part 32 is a forwards protruding curved surface.

As shown in FIG. 1 to FIG. 4, as another preferred structural form, the low-beam primary optical element 1 sequentially, from back to front, includes at least one low-beam condensation part 11 and a low-beam light passing part 12; the low-beam light passing part 12 and the lens light-incidence part 31 are integrated; and a front edge of the lower surface of the low-beam light passing part 12 is formed into a low-beam cut-off line structure 13. The high-beam primary optical element 2 includes at least one high-beam condensation part 21; a high-beam light-exiting surface 24 is formed at the front end of the high-beam condensation part 21; and when there are a plurality of high-beam condensation parts 21, a shared high-beam light-exiting surface 24 is formed at the front ends of the plurality of high-beam condensation parts 21.

In the vehicle light optical element assembly of the present disclosure, the front edge of the lower surface of the low-beam light passing part 12 is formed into the low-beam cut-off line structure 13, and the shape of the low-beam cut-off line structure 13 matches the shape of a low-beam cut-off line 8. The light passes through the low-beam light passing part 12 and then enters the lens 3, so that a low-beam lighting light shape having the low-beam cut-offline 8 can be formed through the low-beam cut-off line structure 13. Moreover, after exiting from the high-beam light-exiting surface 24 of the high-beam primary optical element 2 and then passing through the lens 3, the light can form a high-beam lighting light shape; part of the light exiting from the high-beam primary optical element 2 is emitted to the low-beam cut-off line structure 13, and is projected by the lens 3 to form a high-beam cut-off line; and at this time, the high-beam cut-off line overlaps the low-beam cut-off line 8, and the low-beam lighting light shape and the high-beam lighting light shape are well engaged.

Figure 5:
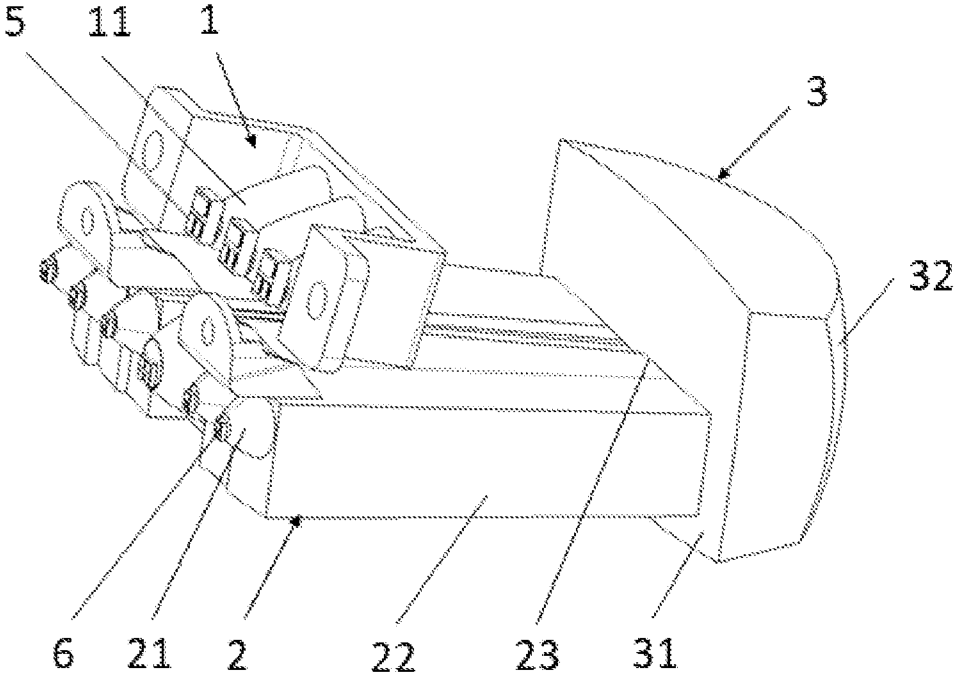
FIG. 5 is a three-dimensional structural schematic diagram of a vehicle light optical element assembly of a second specific embodiment of the present disclosure.
Figure 6:
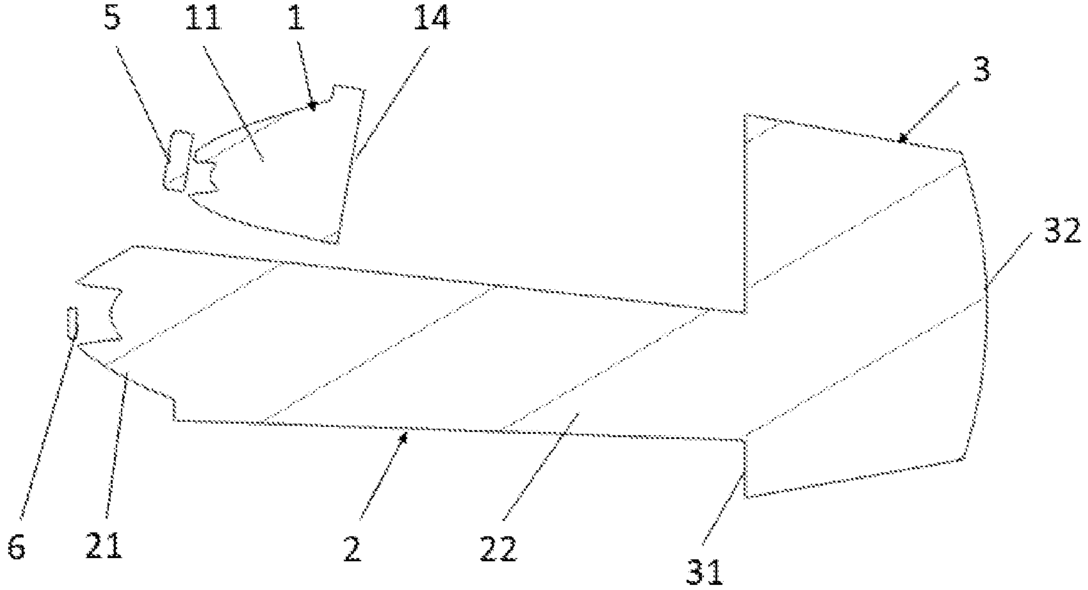
FIG. 6 is a cutaway view of FIG. 5.
Figure 7:
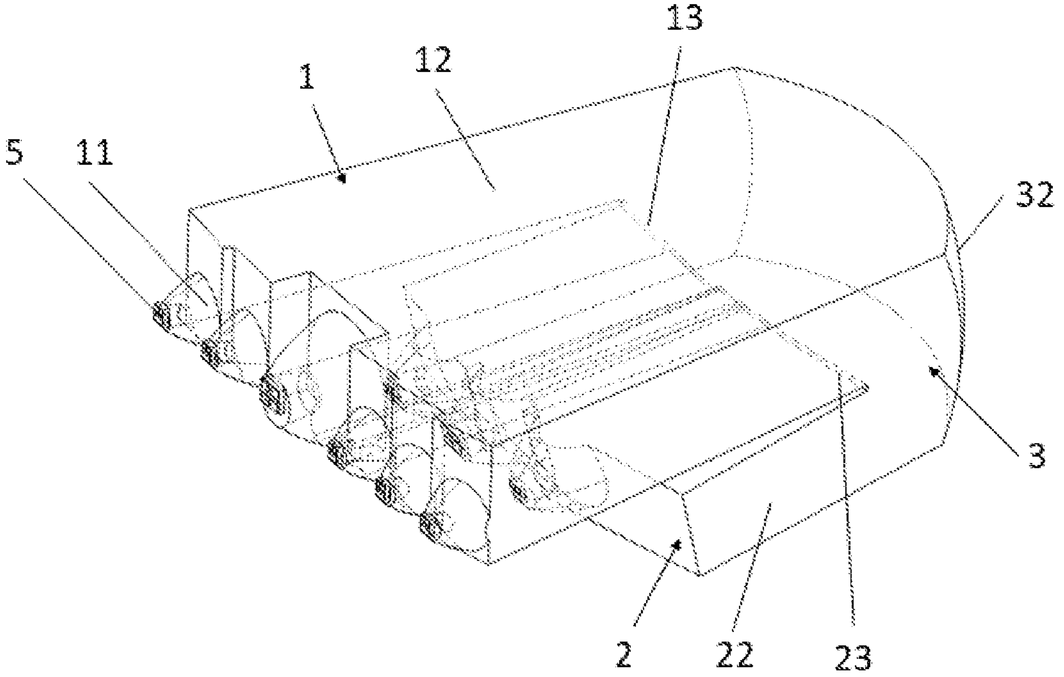
FIG. 7 is a three-dimensional structural schematic diagram I of a vehicle light optical element assembly of a third specific embodiment of the present disclosure.
Figure 8:
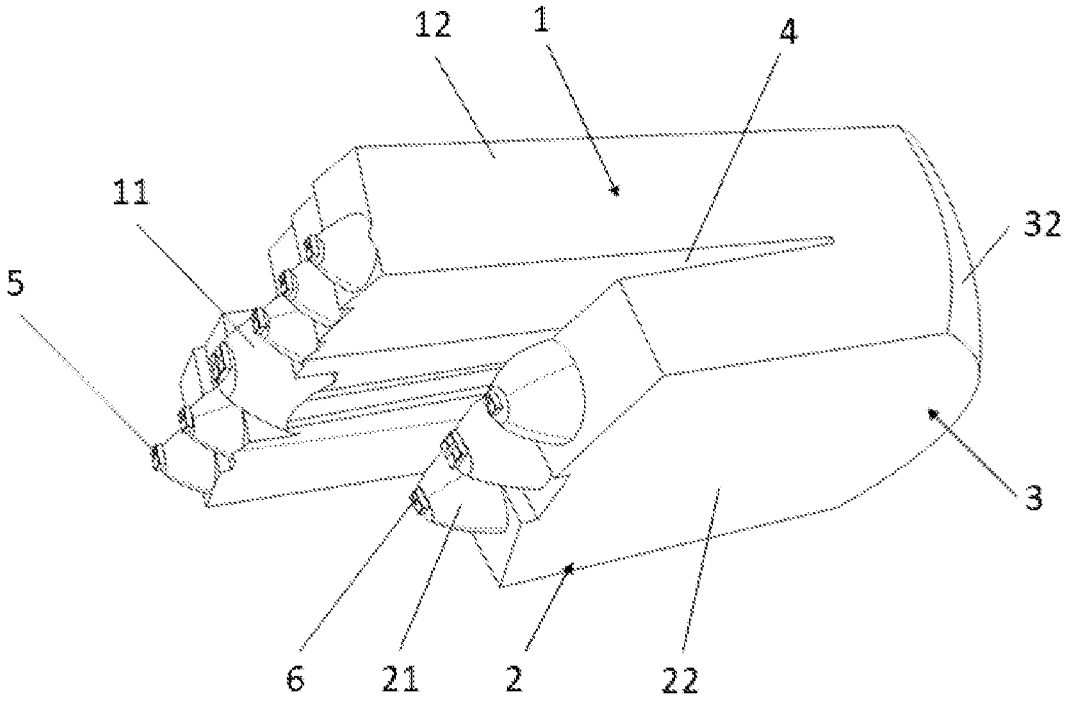
FIG. 8 is a three-dimensional structural schematic diagram II of a vehicle light optical element assembly of the third specific embodiment of the present disclosure.
Figure 9:
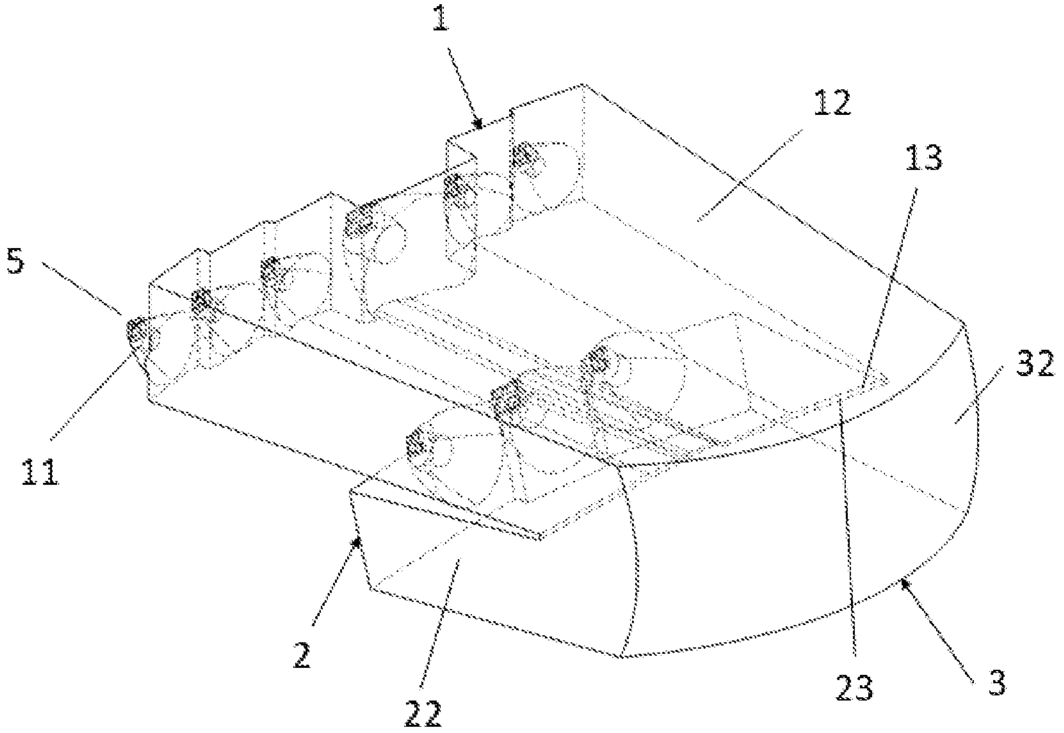
FIG. 9 is a three-dimensional structural schematic diagram III of a vehicle light optical element assembly of the third specific embodiment of the present disclosure.
Figure 10:
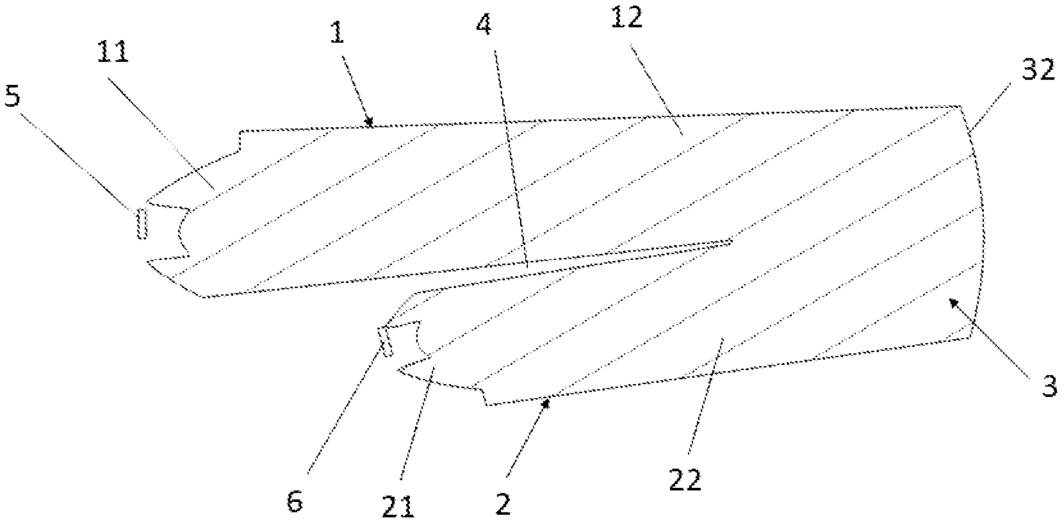
FIG. 10 is a cutaway view of FIG. 9.

As shown in FIG. 5 and FIG. 6, as another optional structural form of the above-mentioned preferred structural form, the high-beam primary optical element 2 sequentially, from back to front, includes at least one high-beam condensation part 21 and a high-beam light passing part 22; the high-beam light passing part 22 and the lens light-incidence part 31 are integrated; and a front edge of the upper surface of the high-beam light passing part 22 is formed into a high-beam cut-off line structure 23. The low-beam primary optical element 1 includes at least one low-beam condensation part 11; a low-beam light-exiting surface 14 is formed at the front end of the low-beam condensation part 11; and when there are a plurality of low-beam condensation parts 11, a shared low-beam light-exiting surface 14 is formed at the front ends of the plurality of low-beam condensation parts 11.

Similarly, in the vehicle light optical element assembly of the present disclosure, the front edge of the upper surface of the high-beam light passing part 22 is formed into the high-beam cut-off line structure 23, and the shape of the high-beam cut-off line structure 23 matches the shape of the low-beam cut-off line 8. The light passes through the high-beam light passing part 22 and then enters the lens 3, so that a high-beam lighting light shape having the high-beam cut-off line can be formed through the high-beam cut-off line structure 23. Moreover, after exiting from the low-beam light-exiting surface 14 of the low-beam primary optical element 1 and then passing through the lens 3, the light can form a low-beam lighting light shape; part of the light exiting from the low-beam primary optical element 1 is emitted to the high-beam cut-off line structure 23, and is projected by the lens 3 to form the low-beam cut-off line 8; and at this time, the low-beam cut-off line 8 overlaps the high-beam cut-off line, and the low-beam lighting light shape and the high-beam lighting light shape are well engaged. Of course, a corresponding low-beam cut-off line structure may be provided on the light-exiting surface of the low-beam primary optical element 1. These situations all fall within the protection scope of the present disclosure.

In the above-mentioned two structural forms, one of the low-beam primary optical element 1 and the high-beam primary optical element 2 is not connected to the lens 3; furthermore, this optical element omits a longer light passing part, and directly forms the light-exiting surface at the front end of the condensation part, so that while it is ensured that the low-beam lighting light shape or the high-beam lighting light shape corresponding thereto can be realized, materials can be saved, and the weight of the vehicle lighting device can be reduced.

It should be explained here that according to "GB 4599-2007-Automotive Filament Bulb Headlamps", it is defined that: the light and shade cut-off line is a boundary line presenting a visibly perceptible change in light and shade after a light beam is projected onto a light distribution screen. The low-beam cut-off line 8 refers to an upper boundary of the low-beam lighting light shape, and the high-beam cut-off line refers to a lower boundary of the high-beam lighting light shape. Different countries have different regulations on the shape of the low-beam cut-off line 8. The high-beam cut-off line shall theoretically overlap the low-beam cut-off line 8 or not be provided. The light distribution screen refers to a vertical screen disposed at 25 m in front of a vehicle.

As shown in FIG. 7 to FIG. 10, as a further optional structural form of the above-mentioned preferred structural form, the low-beam primary optical element 1 sequentially, from back to front, includes at least one low-beam condensation part 11 and a low-beam light passing part 12. The high-beam primary optical element 2 sequentially, from back to front, includes at least one high-beam condensation part 21 and a high-beam light passing part 22. The low-beam light passing part 12 and the high-beam light passing part 22 are integrated with the lens light-incidence part 31; the front edge of the lower surface of the low-beam light passing part 12 is formed into a low-beam cut-off line structure 13, and the front edge of the upper surface of the high-beam light passing part 22 is formed into a high-beam cut-off line structure 23; and a wedge-shaped gap 4 is formed between the low-beam light passing part 12 and the high-beam light passing part 22.

Differing from the above-mentioned two structural forms, the low-beam primary optical element 1 and the high-beam primary optical element 2 may also be simultaneously integrated with the lens 3. The front edge of the lower surface of the low-beam light passing part 12 is formed into the low-beam cut-off line structure 13, and the front edge of the upper surface of the high-beam light passing part 22 is formed into the high-beam cut-off line structure 23. At this time, due to the processing technology, the low-beam cut-off line structure 13 and the high-beam cut-off line structure 23 will not overlap, thus causing a gap existing between the low-beam cut-off line 8 having the low-beam lighting light shape and the high-beam cut-off line having the high-beam lighting light shape, so that the low-beam lighting light shape and the high-beam lighting light shape cannot be well engaged. This phenomenon may be made up for through a light distribution means. The low-beam primary optical element 1, the high-beam primary optical element 2 and the lens 3 in the structural form are made into an integrated structure, so that the positioning and installation error is greatly reduced, and low-beam light shape and high-beam light shape with higher accuracy can be thus formed.

More preferably, a plurality of low-beam condensation parts 11 are provided in a left-right direction, and a plurality of high-beam condensation parts 21 are provided in a left-right direction.

The low-beam condensation parts 11 and the high-beam condensation parts 21 of the present disclosure are both of condensation cup structures, but the low-beam condensation parts 11 and the high-beam condensation parts 21 of the present disclosure are not limited to this structure and arrangement mode. They may also be of condensation cup structures or other condensation structures provided into a matrix, or may further be of independent condensation cup structures or other condensation structures. These situations all fall within the protection scope of the present disclosure.

As another preferred structural form, the low-beam condensation part 11 is of a condensation cup structure or a protrusion structure which protrudes towards the back.

More preferably, the high-beam condensation part 21 is of a condensation cup structure or a protrusion structure which protrudes towards the back.

The low-beam condensation part 11 and the high-beam condensation part 21 play a role in focusing and collimating light emitted by light sources, so that the low-beam condensation part 11 and the high-beam condensation part 21 may be set to be of the condensation cup structures according to their functional requirements, or may also be of the protrusion structures which protrude towards the back, or may further be of pyramid structures that protrude towards the back, or may further be of other structures, as long as they can satisfy a function of focusing and collimating the light. These situations all fall within the protection scope of the present disclosure.

As a yet further preferred structural form, the back end of the condensation cup structure is provided with a concave cavity; the bottom of the concave cavity is provided with a protrusion; and an external contour surface of the condensation cup structure is of a curved structure having an aperture that is gradually increased from the back end to the front end.

Optionally, the condensation cup structure is solid, a light-incidence surface of which is a plane, a convex curved surface or a concave curved surface; and the external contour surface of the condensation cup structure is of a curved structure having an aperture that is gradually increased from the back end to the front end.

Figure 3:
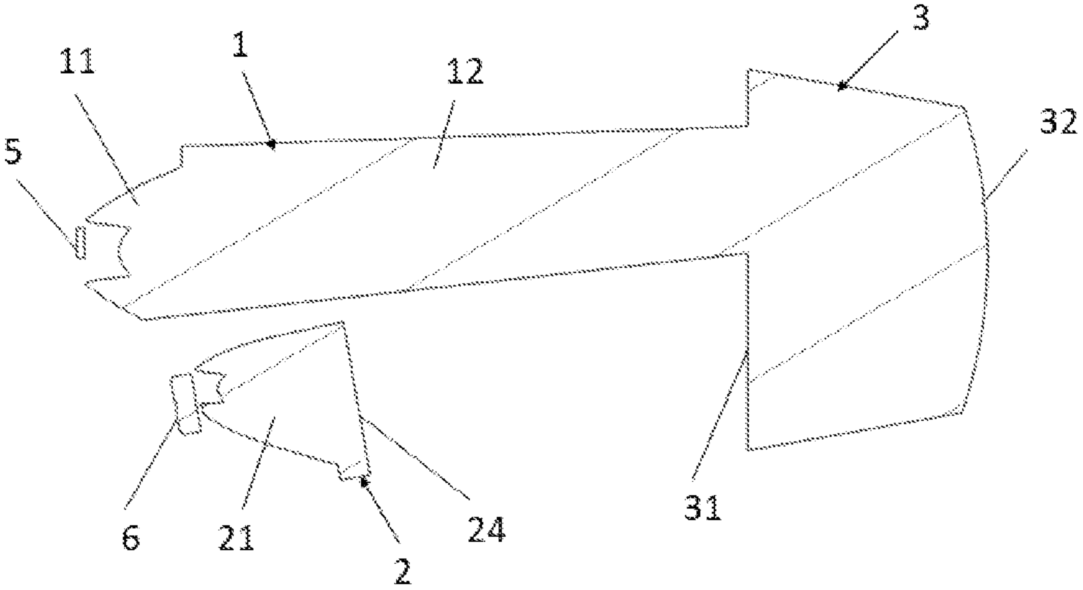
FIG. 3 is a cutaway view of FIG. 2.
Figure 4:
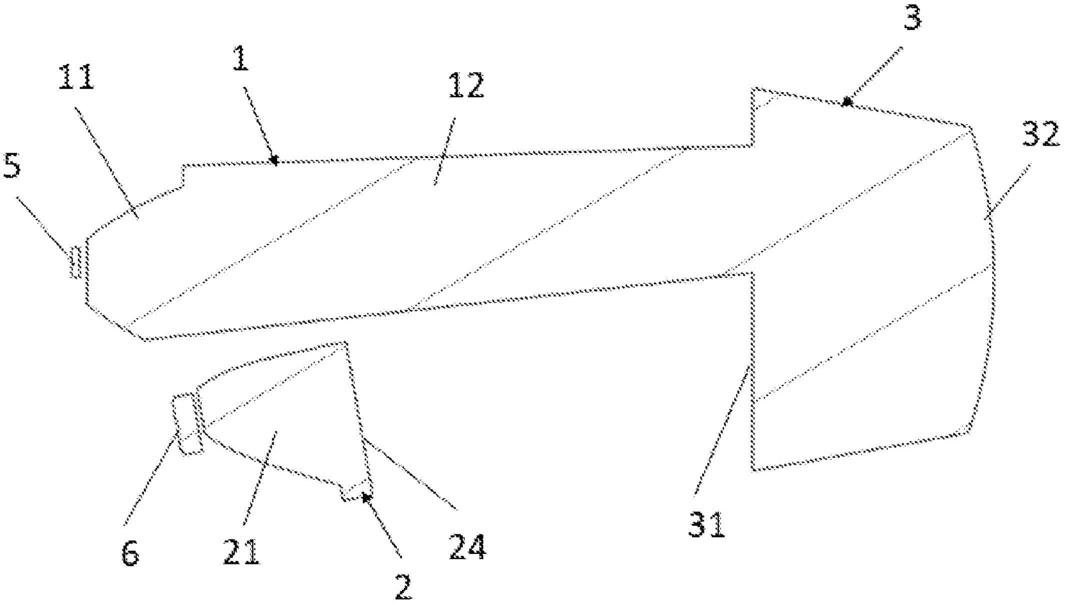
FIG. 4 is a cutaway view of another condensation structure of the first specific embodiment of the present disclosure.

It can be seen from comparison between FIG. 3 and FIG. 4 that the condensation cup structure may be provided with a concave cavity, or may be solid. Both types of the condensation cup structures can meet the light focusing and collimation effect.

In addition, the present disclosure further provides a vehicle lighting device 7. The vehicle lighting device 7 includes low-beam light sources 5, high-beam light sources 6, and the vehicle light optical element assembly according to any one of the above-mentioned technical solutions. The low-beam light sources 5 are in one-to-one correspondence to the low-beam condensation parts 11, and the high-beam light sources 6 are in one-to-one correspondence to the high-beam condensation parts 21.

Specifically, the vehicle lighting device 7 further includes a low-beam circuit board and a high-beam circuit board; the low-beam light sources 5 are provided on the low-beam circuit board; and the high-beam light sources are provided on the high-beam circuit board.

Optionally, the vehicle lighting device 7 further includes a circuit board, and the low-beam light sources 5 and the high-beam light sources 6 are both provided on the circuit board.

It can be seen from the above-mentioned description that there are a plurality of low-beam light sources 5 and a plurality of high-beam light sources 6, and the low-beam light sources 5 and the high-beam light sources 6 need to be installed on the circuit board. There may be two installation modes here: In the first mode, the low-beam light sources 5 are provided on one low-beam circuit board, and the high-beam light sources 6 are provided on one high-beam circuit board. In the second mode, the low-beam light sources 5 and the high-beam light sources 6 are provided on the same circuit board. A specific installation mode is selected according to an actual situation.

The vehicle light optical element assembly in the vehicle lighting device 7 of the present disclosure is smaller in size, so that the vehicle lighting device 7 of the present disclosure is gradually developing towards minimization. The minimization of the vehicle lighting device 7 is conductive to arranging the vehicle lighting device 7 in a limited space of a lamp body of a vehicle light at will, and can realize different light-exiting modeling surfaces by means of different arrangement forms.

Further, the present disclosure further provides a vehicle light, including at least one vehicle lighting device 7 according to at least one of the technical solutions.

Figure 11:
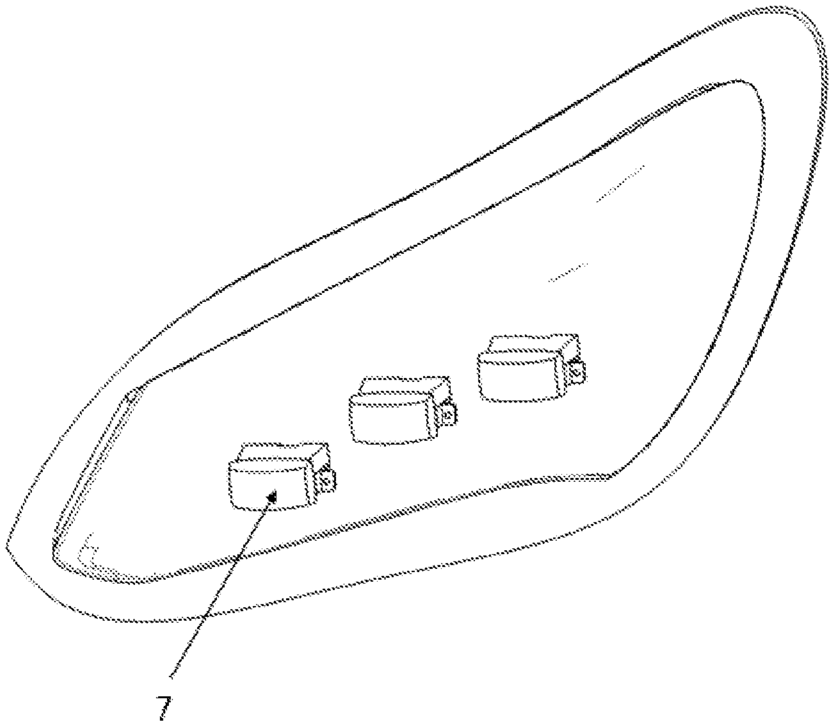
FIG. 11 is a structural schematic diagram of a vehicle lighting device of a specific implementation mode of the present disclosure.

It can be seen from FIG. 11 that the vehicle light of the present disclosure includes three vehicle lighting devices 7. These vehicle lighting devices 7 are usually provided according to one straight line or curved line, or provided according to a matrix form. This is set according to an actual light-exiting requirement and modeling requirement of the vehicle light.

In addition, the present disclosure further provides a vehicle, including the vehicle light in the above-mentioned technical solution.

It can be seen from the above-mentioned description that the vehicle light optical element assembly of the present disclosure includes the low-beam primary optical element 1, the high-beam primary optical element 2 provided below the low-beam primary optical element 1, and the lens 3 provided at the front end of the low-beam primary optical element 1 and/or the high-beam primary optical element 2. The low-beam primary optical element 1 and/or the high-beam primary optical element 2 are/is integrated with the lens 3; and the low-beam primary optical element 1 and the high-beam primary optical element 2 are suitable for focusing and collimating light and then forming a low-beam lighting light shape and a high-beam lighting light shape via the lens 3. By means of integrating the low-beam primary optical element 1 with the lens 3, or integrating the high-beam primary optical element 2 with the lens 3, or simultaneously integrating the low-beam primary optical element 1 and the high-beam primary optical element 2 with the lens 3, the size of the vehicle light optical element assembly of the present disclosure can be effectively reduced without affecting high-beam lighting and low-beam lighting; and moreover, the positioning and installation error can also be reduced, and the optical system accuracy is improved.

The preferable implementation modes of the present disclosure are described above in detail with reference to the accompanying drawings. However, the present disclosure is not limited to the specific details in the foregoing implementation modes. Various simple variations may be made to the technical solutions of the present disclosure within the technical concept ranges of the present disclosure, and these simple variations all fall within the protection scope of the present disclosure.

In addition, it should be noted that the various specific technical features described in the above specific implementation modes may be combined in any suitable manner without contradiction. In order to avoid unnecessary repetition, various possible combination modes will not be additionally described in the present disclosure.

In addition, various different implementation modes of the present disclosure may also be arbitrarily combined, and these combinations should also be regarded as the content disclosed in the present disclosure, as long as they do not violate the idea of the present disclosure.

The invention claimed is:

1. A vehicle light optical element assembly, comprising a low-beam primary optical element, a high-beam primary optical element provided below the low-beam primary optical element, and a lens provided on the front end of the low-beam primary optical element and/or the high-beam primary optical element, wherein the low-beam primary optical element is integrated with the lens; the low-beam primary optical element sequentially, from back to front, comprises at least one low-beam condensation part and a low-beam light passing part; the low-beam light passing part and a lens light-incidence part are integrated; a front edge of a lower surface of the low-beam light passing part is formed into a low-beam cut-off line structure; the high-beam primary optical element comprises at least one high-beam condensation part; a high-beam light-exiting surface is formed at a front end of the high-beam condensation part; and a high-beam light-exiting surface is formed at a front end of the high-beam condensation part, and there is a gap between the high-beam light-exiting surface and the lens light-incidence part, and there is no high-beam light passing part set on the high-beam primary optical element; or the high-beam primary optical element is integrated with the lens; the high-beam primary optical element sequentially, from back to front, comprises at least one high-beam condensation part and a high-beam light passing part; the high-beam light passing part and the lens light-incidence part are integrated; and a front edge of an upper surface of the high-beam light passing part is formed into a high-beam cut-off line structure; the low-beam primary optical element comprises at least one low-beam condensation part; a low-beam light-exiting surface is formed at a front end of the low-beam condensation part; and a low-beam light-exiting surface is formed at a front end of the low-beam condensation part, and there is a gap between the low-beam light-exiting surface and the lens light-incidence part, and there is no low-beam light passing part set on the low-beam primary optical element; and the lens comprises a lens light-incidence part and a lens light-exiting part; the lens light-incidence part is a plane, a backwards protruding curved surface or a forwards protruding curved surface; and the lens light-exiting part is a forwards protruding curved surface; and the low-beam primary optical element and the high-beam primary optical element are suitable for focusing and collimating light and then forming a low-beam lighting light shape and a high-beam lighting light shape via the lens.

2. The vehicle light optical element assembly according to claim 1, wherein a plurality of low-beam condensation parts are provided in a left-right direction, and a plurality of high-beam condensation parts are provided in a left-right direction.

3. The vehicle light optical element assembly according to claim 1, wherein the low-beam condensation part is of a condensation cup structure or a protrusion structure which protrudes towards the back.

4. The vehicle light optical element assembly according to claim 1, wherein the high-beam condensation part is of a condensation cup structure or a protrusion structure which protrudes towards the back.

5. The vehicle light optical element assembly according to claim 4, wherein a back end of the condensation cup structure is provided with a concave cavity; the bottom of the concave cavity is provided with a protrusion; an external contour surface of the condensation cup structure is of a curved structure having an aperture that is gradually increased from the back end to the front end; or the condensation cup structure is solid, a light-incidence surface of which is a plane, a convex curved surface or a concave curved surface; and an external contour surface of the condensation cup structure is of a curved structure having an aperture that is gradually increased from the back end to the front end.

6. A vehicle lighting device, comprising low-beam light sources, high-beam light sources, and the vehicle light optical element assembly according to claim 1, wherein the low-beam light sources are in one-to-one correspondence to the low-beam condensation parts, and the high-beam light sources are in one-to-one correspondence to the high-beam condensation parts.

7. The vehicle lighting device according to claim 6, further comprising a low-beam circuit board and a high-beam circuit board; the low-beam light sources are provided on the low-beam circuit board; the high-beam light sources are provided on the high-beam circuit board; or the vehicle lighting device further comprises a circuit board, wherein the low-beam light sources and the high-beam light sources are both provided on the circuit board.

8. A vehicle light, comprising at least one vehicle lighting device according to claim 6.

9. The vehicle light according to claim 8, further comprising a low-beam circuit board and a high-beam circuit board; the low-beam light sources are provided on the low-beam circuit board; the high-beam light sources are provided on the high-beam circuit board; or the vehicle lighting device further comprises a circuit board, wherein the low-beam light sources and the high-beam light sources are both provided on the circuit board.

10. The vehicle light according to claim 8, wherein the plurality of low-beam condensation parts are provided in a left-right direction, and a plurality of high-beam condensation parts are provided in a left-right direction.

11. The vehicle light according to claim 8, wherein the low-beam condensation part is of a condensation cup structure or a protrusion structure which protrudes towards the back.

12. The vehicle light according to claim 8, wherein the high-beam condensation part is of a condensation cup structure or a protrusion structure which protrudes towards the back.

13. The vehicle light according to claim 12, wherein a back end of the condensation cup structure is provided with a concave cavity; the bottom of the concave cavity is provided with a protrusion; an external contour surface of the condensation cup structure is of a curved structure having an aperture that is gradually increased from the back end to the front end; or the condensation cup structure is solid, a light-incidence surface of which is a plane, a convex curved surface or a concave curved surface; and an external contour surface of the condensation cup structure is of a curved structure having an aperture that is gradually increased from the back end to the front end.

14. The vehicle lighting device according to claim 6, wherein the plurality of low-beam condensation parts are provided in a left-right direction, and a plurality of high-beam condensation parts are provided in a left-right direction.

15. The vehicle lighting device according to claim 6, wherein the low-beam condensation part is of a condensation cup structure or a protrusion structure which protrudes towards the back.

16. The vehicle lighting device according to claim 6, wherein the high-beam condensation part is of a condensation cup structure or a protrusion structure which protrudes towards the back.

17. The vehicle lighting device according to claim 16, wherein a back end of the condensation cup structure is provided with a concave cavity; the bottom of the concave cavity is provided with a protrusion; an external contour surface of the condensation cup structure is of a curved structure having an aperture that is gradually increased from the back end to the front end; or the condensation cup structure is solid, a light-incidence surface of which is a plane, a convex curved surface or a concave curved surface; and an external contour surface of the condensation cup structure is of a curved structure having an aperture that is gradually increased from the back end to the front end.

* * * * *